Patented Dec. 28, 1943

2,337,641

UNITED STATES PATENT OFFICE 2,337,641

MOLASSES TREATMENT

William H. Buhrig, Mount Vernon, N. Y., and Henry M. Harff, Wilmette, Ill., assignors to Standard Brands Incorporated, New York, N. Y., a corporation of Delaware No Drawing. Application October 18, 1940, Serial No. 361,730

6 Claims. (Cl. 127—48)

The invention relates to a process for the treatment of molasses. More particularly, it pertains to a process for the purification of molasses, and includes correlated improvements and discoveries whereby it is rendered more suitable for utilization.

An object of the invention is to treat molasses in a manner which leads to removal of impurities.

A further object of the invention is the provision of a process in accordance with which impure molasses may be conditioned for use in various industrial operations, and rendered free from bacteria, including spore-forming bacteria.

Another object of the invention is to provide a process whereby a molasses may be readily, economically and effectively freed from undesired substances.

A particular object of the invention is the provision of a process for the treatment of cane molasses whereby its qualities are enhanced for inclusion in a medium that is seeded or inoculated with yeast.

A specific object of the invention is to remove impurities from cane molasses in preparation for its use in a yeast nutrient medium.

Other objects of the invention will in part be obvious and will in part appear hereinafter.

The invention accordingly comprises the several steps and the relation of one or more of such steps with respect to each of the others thereof, which will be exemplified in the process hereinafter disclosed, and the scope of the invention will be indicated in the claims.

In the practice of the invention a molasses, either cane or beet, or an admixture thereof, and especially cane molasses, may be freed from impurities by a process which entails diluting the molasses, and then heating under pressure for a suitable period. When the molasses has been so heated the pressure is released and the mass desirably transferred to a suitable receptacle or tank. There may then be added a quantity of water, desirably hot, whereupon an effective mixing may be accomplished by means of air. The mixing having been completed the molasses is now permitted to stand for a number of hours whereby impurities settle and the cleared supernatant molasses may be withdrawn, as by decantation.

Further, a more complete removal of undesirable substances may be accomplished by subjecting the decanted molasses to clarification, as by centrifugation. The molasses thus treated with effectuation of purification may be employed alone in a yeast nutrient medium, or in conjunction with a beet molasses. Moreover, the two molasses may be admixed prior to inclusion in a wort, which may be either for the production of yeast or of spirits.

More particularly, the treatment of molasses may be accomplished by diluting cane molasses to about 30 to 50° Balling, specifically to about 40° Balling, and heating in a closed cooker until a pressure of from 5 to 20 lbs. per square inch, and suitably 10 lbs. per square inch, has been reached, whereupon the pressure is maintained for a period of about one hour. In order to increase the effectiveness of the pressure treatment, an adjustment of the pH of the molasses may be made by addition of an acid or an alkali according to the character of the molasses. It has been found that a pH value of 4 to 6, especially 5, gives satisfactory results. This is followed by release of the pressure and transfer of the heated molasses to a suitable receptacle wherein it is diluted, preferably with hot water, and mixed well with air for about 30 minutes. The molasses is now permitted to stand quietly for from ten to twelve hours, which leads to a settling of impurities. At the end of this period the cleared supernatant molasses may be decanted in an amount of 80% of the total volume, and this may be used either alone or in conjunction with a beet molasses in the preparation of media which are seeded or inoculated with yeast, either for the manufacture of yeast or of spirits. If desirable, a decanted molasses may be further clarified by passing through a centrifuge operating at a relatively high speed. The 20% which remains following removal of the clear molasses contains the various impurities, and may be utilized as a starting or raw material for the production of alcohol, or the approximately remaining 20% may be exhausted by one or more decantations, if so desired.

As an illustrative embodiment of a manner in which the invention may be practiced, the following examples are presented:

*I*

A quantity of molasses, which may be about 82 lbs. of cane molasses, may be introduced into a pressure cooking receptacle, as an autoclave, and diluted to about 40° Balling. The diluted molasses is now heated or cooked for about one hour at 10 lbs. pressure, following which the pressure is released and the molasses transferred to a vessel in which it is diluted further with hot water; mixed well with air for about 30 minutes, and then permitted to settle for about twelve hours. Clear supernatant molasses is now separated from settled impurities or sludge in a suitable manner, desirably by decantation, and it has been found that approximately 80% of the diluted molasses may be removed in this manner.

II

A cane molasses in an amount of about 75 lbs. may be placed in a pressure cooker diluted to about 40° Balling, and cooked for about one hour at about 10 lbs. pressure. The cooked molasses is then transferred to a tub or tank in which it is further diluted with hot water; mixed well with air for about 30 minutes, and permitted to stand for settling for a period of from ten to twelve hours. Then about 80% of the cleared supernatant molasses may be withdrawn by decantation, and may be utilized as an ingredient in the preparation of a mash or wort for spirit manufacture. In order further to clarify the molasses, decanted material may be passed through a centrifuge rotating at about 6000 R. P. M. There is thus obtained a molasses which is well adapted for the manufacture of yeast, since the yeast produced is of a suitably light color.

The foregoing procedure leads to the production of a molasses, especially of cane molasses, which may be employed in media for the manufacture of yeast, for the production of spirits, and other procedures which involve yeast growth and/or fermentation by yeast. Moreover, the process leads to the removal of impurities which may be coagulated proteins and pectins, together with silica and lime, and to the freeing of the molasses from bacteria, including spore-forming bacteria, e. g., those of the Mesentericus type.

Since certain changes may be made in carrying out the above process without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent is:

1. A process for the treatment of molasses, which comprises diluting a molasses to 30 to 50° Balling, heating the diluted molasses at a pH value of 4 to 6 under pressure of about 10 lbs., adding hot water to the heated molasses, mixing with air for about thirty minutes, permitting impurities to settle for a period of from ten to twelve hours, and separating supernatant molasses from settled material.

2. A process for the treatment of molasses, which comprises diluting cane molasses to 30 to 50° Balling, heating the diluted molasses at a pH value of 4 to 6 under pressure of about 10 lbs., adding hot water to the heated molasses, mixing with air for about thirty minutes, permitting impurities to settle for a period of from ten to twelve hours, separating supernatant molasses from settled material, and clarifying thus separated molasses by centrifugation at about 6000 R. P. M.

3. A process for the treatment of molasses, which comprises diluting cane molasses to 30 to 50° Balling, adjusting the pH to a value of 4 to 6, heating under pressure of about 10 lbs., adding hot water to the heated molasses, mixing with air for about thirty minutes, permitting impurities to settle for a period of from ten to twelve hours, and separating supernatant molasses from settled material.

4. A process for the treatment of molasses which comprises diluting a molasses to from 30 to 50° Balling, heating the diluted molasses at a pH value of 4 to 6 under pressure of about 5 to 20 lbs., then permitting impurities to settle, and separating supernatant molasses from settled material.

5. A process for the treatment of molasses, which comprises diluting a molasses to from 30 to 50° Balling, heating the diluted molasses at a pH value of 4 to 6 under pressure of about 5 to 20 lbs., maintaining the pressure for a period of about one hour, then diluting further, mixing, permitting impurities to settle, and separating supernatant molasses from settled material.

6. A process for the treatment of molasses, which comprises diluting cane molasses to from 30 to 50° Balling, heating the diluted molasses at a pH value of 4 to 6 under pressure of about 5 to 20 lbs., then permitting impurities to settle, and separating supernatant molasses from settled material.

WILLIAM H. BUHRIG.
HENRY M. HARFF.